Patented Apr. 15, 1941

2,238,059

UNITED STATES PATENT OFFICE 2,238,059

OBTAINMENT OF VITAMINOUS OILS

William S. Jones, Brooklyn, N. Y., assignor to E. R. Squibb & Sons, New York, N. Y., a corporation of New York No Drawing. Application March 10, 1938,
Serial No. 195,098

4 Claims. (Cl. 260—412.1)

This invention relates to the obtainment of vitaminous oils from the tissues of such fish, inter alia, as the halibut, swordfish, salmon, ling, and tuna.

Numerous methods have heretofore been devised for the obtainment of vitaminous oils from the livers and other tissues of fish—for example, centrifuging, expression, and extraction—but all of them, particularly extraction, give products containing excessive amounts of free fatty acids and coloring matter. For the removal of such contaminants, difficult and expensive subsequent treatment are required. Furthermore, several extractions are frequently necessary in order to obtain a full yield of oil.

It is the object of this invention to provide an efficient and economical method for the obtainment of vitaminous oils from fish tissues.

In the practice of this invention, the acids and coloring matter within the fish tissues are first fixed in the tissue proteins by admixing an alkali-metal hydroxide with the tissues; then there is added a solvent for fatty oils, preferably ethylene dichloride, which extracts the oil but not the alkali-fixed acids and coloring matter; and finally, (preferably after adding alcohol) the oil solution is separated, and, the solvent being evaporated therefrom, 90% of the oil originally present in the tissues is secured.

The following example is illustrative of the invention: 40 cc. of a 40% aqueous solution of sodium hydroxide is added to 400 g. of comminuted (raw or cooked) halibut livers; the mixture is thoroughly agitated, heated for twenty minutes by direct introduction of steam, allowed to cool, and thoroughly mixed with 250 cc. of ethylene dichloride. 100 cc. of alcohol is then intimately incorporated into the mixture, and after standing, 300 cc. of a light-colored ethylene dichloride layer separates out; then, drawing off this ethylene-dichloride solution of the liver oil, adding a filter aid (e. g., "Hyflocel") thereto, filtering, evaporating off the solvent, and drying the extract, yields the desired vitaminous fish-liver oil as a light-colored viscous liquid of low acidity (its free fatty acid content being 0.17%), weighing 50.2 g. (approximately 90% of the oil contained in the original fish-liver tissue).

A second extraction of the remaining liver chum with another 250 cc. portion of ethylene dichloride yields the greater part of the remaining oil (approximately 9.0% of the oil contained in the original fish-liver tissue). Alcohol need not be added to accelerate separation in this second extraction, sufficient alcohol remaining in the chum from the first extraction to cause the ethylene-dichloride solution of the liver oil to separate out readily.

Preferably, this second solution is used in extracting the fish-liver oils from a new 400 g. portion of fish-liver tissue which has previously been alkalized, steamed, and cooled as above described; and thus is obtained (after adding 100 cc. of alcohol, drawing off the solution of liver oil, filtering, evaporating, and drying) over 90% of the vitaminous fish-liver oil in the second 400 g. portion of liver tissue, in addition to the oil previously obtained from the second extraction of the first 400 g. portion.

The oil obtained by this process is characterized by its light-yellow color, low acidity and bland taste. The process is highly efficient, only 0.5 to 1.0% of the fish-liver oil originally present remaining in the chum after two extractions. The alcohol used may be recovered from the chum by distillation; and the ethylene dichloride is recovered by condensation when the liver oil solution is evaporated. Among the fatty-oil-extracting solvents which may be substituted for ethylene dichloride are ethylene trichloride, dichloroethyl ether, ethyl ether, benzene, and petroleum ether.

The invention may be variously otherwise embodied within the scope of the appended claims.

I claim:

1. The method of obtaining a vitaminous oil from fish tissues that comprises heating the tissues with substantially the amount of alkali-metal hydroxide required to fix the acids and coloring matter within the fish-tissue proteins, extracting a vitaminous oil from the thus-treated tissues with a solvent for fatty oils, and recovering the oil from the extract.

2. The method of obtaining a vitaminous oil from fish tissues that comprises heating the tissues with substantially the amount of alkali-metal hydroxide required to fix the acids and coloring matter within the fish-tissue proteins, extracting a vitaminous oil from the thus-treated tissues with a solvent for fatty oils, adding alcohol, separating the extract, and recovering the oil therefrom.

3. The method of obtaining a vitaminous oil from fish livers that comprises heating the comminuted livers with substantially the amount of alkali-metal hydroxide required to fix the acids and coloring matter within the fish-liver proteins, extracting a vitaminous oil from the thus-treated livers with a solvent for fatty oils, and recovering the oil from the extract.

4. The method of obtaining a vitaminous oil from fish tissues that comprises steaming the tissues in the presence of substantially the amount of alkali-metal hydroxide required to fix the acids and coloring matter within the fish-tissue proteins, extracting a vitaminous oil from the thus-treated tissues with a solvent for fatty oils, and recovering the oil from the extract.

WILLIAM S. JONES.